(12) United States Patent
Palmer et al.

(10) Patent No.: US 9,373,007 B2
(45) Date of Patent: Jun. 21, 2016

(54) LOW-COST CAPACITIVE SENSING DECODER

(71) Applicant: ANALOG DEVICES TECHNOLOGY, Hamilton (BM)

(72) Inventors: Joseph Wayne Palmer, Pucol (ES); Paul Vincent Errico, Andover, MA (US); Liam Patrick Riordan, Limerick (IE); Juan Francisco Escobar Valero, Valencia (ES)

(73) Assignee: Analog Devices Global, Hamilton (BM)

( * ) Notice: Subject to any disclaimer, the term of this patent is extended or adjusted under 35 U.S.C. 154(b) by 0 days.

(21) Appl. No.: 14/086,793

(22) Filed: Nov. 21, 2013

(65) Prior Publication Data

US 2015/0136853 A1 May 21, 2015

(51) Int. Cl.
G06K 7/08 (2006.01)
G06K 19/067 (2006.01)

(52) U.S. Cl.
CPC .............. *G06K 7/081* (2013.01); *G06K 19/067* (2013.01)

(58) Field of Classification Search
CPC ..................................................... G06K 7/081
USPC ......................................................... 235/451
See application file for complete search history.

(56) References Cited

U.S. PATENT DOCUMENTS

| 3,716,701 | A  | * | 2/1973 | Cohen ........................... 235/451 |
| 4,280,119 | A  | * | 7/1981 | May ............................... 235/382 |
| 7,663,607 | B2 | * | 2/2010 | Hotelling et al. ............. 345/173 |
| 8,424,763 | B2 |   | 4/2013 | Charlton et al. |
| 2006/0118612 | A1 | * | 6/2006 | Christoffersen et al. ..... 235/375 |
| 2009/0095623 | A1 |   | 4/2009 | Boiteau et al. |
| 2010/0065341 | A1 | * | 3/2010 | Jeon ............................. 178/18.06 |
| 2010/0084466 | A1 |   | 4/2010 | Charlton et al. |
| 2012/0104096 | A1 | * | 5/2012 | Lee et al. ..................... 235/437 |

(Continued)

FOREIGN PATENT DOCUMENTS

| GB | 938232 | 10/1963 |
| KR | 10-2013-0095732 | 8/2013 |

(Continued)

OTHER PUBLICATIONS

"CapTouch Programmable Controller for Single-Electrode Capacitance Sensors" Data Sheet, AD7147, Rev. D, © 2007-2011 Analog Devices, Inc., 73 pages.
Matthias Essenpreis, et al., "'No Coding' of Glucose Test Strips: A Roche Perspective", Journal of Diabetes Science and Technology, vol. 2, Issue 4, Jul. 2008 © Diabetes Technology Society, 5 pages.
Extended European Search Report issued in EP14191312.9 mailed Apr. 30, 2015, 8 pages.

(Continued)

*Primary Examiner* — Toan Ly
(74) *Attorney, Agent, or Firm* — Patent Capital Group

(57) ABSTRACT

A low-cost system comprising a pattern arranged to encode information and a decoder for decoding the information encoded in the pattern is described. In particular, the mechanism employs a capacitive sensing technique. Electrodes are arranged (or stimulated, during operation) to each generate an electric field, and sense disturbances on the electric field caused by the pattern when the pattern is positioned over the electrodes. The spatial arrangement of the pattern allows information to be encoded on a strip or surface and decoded by capacitive sensors arranged to detect disturbances caused by possible patterns. The resulting solution is cheaper and less complex than optical solutions, e.g., barcodes and optical barcode readers. The mechanism may be used in a glucose meter for encoding and decoding an identifier for distinguishing batches of glucose meter test strips.

20 Claims, 8 Drawing Sheets

(56) References Cited

U.S. PATENT DOCUMENTS

2013/0146478 A1 6/2013 Iyengar et al.
2014/0262828 A1* 9/2014 Iyengar ............ G01N 33/48771
205/777.5

FOREIGN PATENT DOCUMENTS

| TW | 201116825 | 5/2011 |
| TW | 200925591 | 6/2012 |
| TW | 201307841 | 2/2013 |
| TW | I385385 | 2/2013 |
| WO | 2011/154524 | 12/2011 |
| WO | 2013/036056 | 3/2013 |

OTHER PUBLICATIONS

Notice of Preliminary Rejection issued in Korean Patent Application Serial No. 10/2014-0160816 mailed Jul. 28, 2014, 4 pages.
English Summary of Notice of Preliminary Rejection issued in Korean Patent Application Serial No. 10/2014-0160816 mailed Jul. 28, 2014, 3 pages.
OA1 issued in TW Patent Application Serial No. 103137782 mailed Jan. 12, 2016, 3 pages.
English Summary of OA1 issued in TW Patent Application Serial No. 103137782 mailed Jan. 12, 2016, 3 pages.
Notice of Last Preliminary Rejection issued in KR Patent Application Serial No. 10-2014-0160816 mailed Feb. 25, 2016, 5 pages.
English Summary of Notice of Last Preliminary Rejection issued in KR Patent Application Serial No. 10-2014-0160816 mailed Feb. 25, 2016, 3 pages.

* cited by examiner

LOW-COST CAPACITIVE SENSING DECODER

TECHNICAL FIELD OF THE DISCLOSURE

The disclosed technology relates to electronic systems, and more particularly, to a capacitive sensing decoder system that could be applicable to any type of computing device.

BACKGROUND

Code readers are ubiquitous in our daily lives, allowing humans to provide information to an electronic device or system without manually entering the information through a keyboard or a keypad. One type of code reader that is often used are barcode readers, which decodes visual information encoded in a barcode by shining a light source on the barcode and measuring the light reflected from the barcode. Another type of code reader that is often used are QR code readers, which processes a digital photograph of a QR code and decodes the visual information encoded in the QR code. Both barcode readers and QR code readers are costly and complex because they require generating a light source, a lens, a light sensor, and a heavy processor for processing and decoding the visual information.

An alternative to providing a code reader is to ask a human user to provide the information manually. However, such an alternative is prone to user errors (e.g., reading and/or entering a code incorrectly). Furthermore, the alternative is often inconvenient to users who do not wish to provide manual input, or who cannot easily provide manual input.

In one example, it is inconvenient and undesirable to request human users to manually enter a code to a glucose meter to identify/distinguish batches of glucose meter test strips. Typically, a glucose meter accepts a consumable element containing chemicals that react with glucose in the drop of blood is used for each measurement. For some models this element is a plastic test strip with a small spot impregnated with glucose oxidase and other components. Each strip is used once and then discarded. Instead of strips, some models use discs, drums, or cartridges that contain the consumable material for multiple tests. Since test strips may vary from batch to batch, some models require the user to manually enter in a code found on the vial of test strips or on a chip that comes with the test strip. By entering the coding or chip into the glucose meter, the meter will be calibrated to that batch of test strips. However, if this process is carried out incorrectly, the meter reading can be up to 4 mmol/L (72 mg/dL) inaccurate. The implications of an incorrectly coded meter can be serious for patients actively managing their diabetes. This may place patients at increased risk of hypoglycemia.

OVERVIEW

A low-cost system comprising a pattern arranged to encode information and a decoder for decoding the information encoded in the pattern is described. In particular, the mechanism employs a capacitive sensing technique. Electrodes are arranged to each generate an electric field, and sense disturbances on the electric field caused by the pattern when the pattern is positioned over the electrodes. The spatial arrangement of the pattern allows information to be encoded on a strip or surface and decoded by capacitive sensors arranged to detect disturbances caused by possible patterns. The resulting solution is cheaper and less complex than optical solutions, e.g., barcodes and optical barcode readers. The mechanism may be used in a glucose meter for encoding and decoding an identifier for distinguishing batches of glucose meter test strips.

DESCRIPTION OF EXAMPLE EMBODIMENTS OF THE DISCLOSURE

Figure 1:
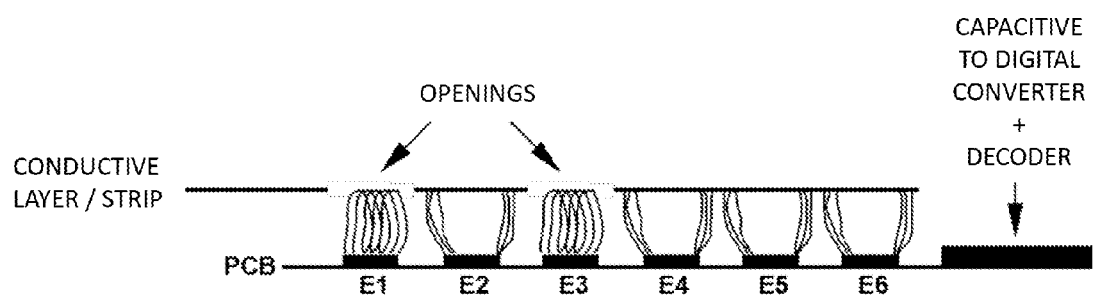
FIG. 1 shows an exemplary implementation of an apparatus configured to decode information encoded using a pattern of openings in a layer or sheet of conductive material, according to some embodiments of the disclosure.

Capacitive sensing is a technology based on capacitive coupling, a capacitive sensor can detect characteristics of materials nearby a capacitive sensor. The materials may either be conductive and/or have a different dielectric than its surroundings. Capacitive sensing is used in many different types of sensors, including those to detect and measure proximity, position or displacement, humidity, fluid level, and acceleration. Capacitive sensing has become more popular as capacitive sensors for detecting changes in capacitance become more accurate and reliable. For instance, capacitive sensors are used in many devices such as laptop trackpads, digital audio players, computer displays, mobile phones, mobile devices, tablets, etc. Design engineers continue to choose capacitive sensors for their versatility, reliability and robustness, and cost reduction over mechanical switches.

Capacitive sensors typically work by providing an electrode on a single- or multiple-layer printed circuit board (PCB)), flex circuit, and/or printed conductor, where the electrode is stimulated to generate an electric field. The sensor electrode on the PCB forms as one plate of a virtual capacitor.

The other plate of the virtual capacitor is provided by an external object, such as a user's finger, or some kind of conductive material, etc. The sensor electrode can measure changes to the capacitance over the virtual capacitor over the sensor electrode as the external object disturbs the electric field generated by the sensor electrode. Using the capacitive measurements, disturbances caused by the external object can be accurately detected.

Leveraging capacitive sensing technology, a pattern provided using conductive materials, which is arranged to selectively disturb the electric fields generated by the electrodes, can be used to encode information. The information can be decoded when the pattern is positioned over the electrodes by detecting changes in capacitance over the electrodes (e.g., at least a subset of electrodes) and translating the detected changes to information encoded in the pattern. For instance, binary information may be encoded by providing a pattern which substantially disturbs the electric field for a subset of the electrodes and does not substantially disturb the electric field for the rest of the electrodes. Disturbance on a particular electric field on the electrode and no disturbance on a particular electric field may translate to binary states, such as "0" and "1". The extent/amount of detected disturbance caused by the pattern on a particular electric field, in some embodiments, may translate to more than two states such that the pattern can encode information with a higher resolution than binary information. The combination of mechanically providing the pattern and the electrodes and capacitively reading the pattern using corresponding electrodes provides a low-cost system for encoding and decoding information.

To decode information encoded in a pattern using capacitive sensing, a plurality of electrodes are provided. Each electrode is stimulated to establish an electric field. Together, the plurality of electrodes are arranged to decode possible patterns and the information encoded in those possible patterns. A pattern typically provide a spatial arrangement over the electrodes using conductive materials to cause disturbance selectively in the electric fields established by the electrodes. Furthermore, circuitry is provided for detecting change or disturbance in at least a subset of the electric fields caused by the pattern when the pattern is positioned over the plurality of electrodes. The pattern may form one or more of virtual capacitors with the plurality of electrodes. Depending on the pattern, different changes in capacitance in these virtual capacitors can be observed or measured. By providing a pattern, i.e., a spatial arrangement of conductive materials, which can cause different changes in capacitance in these virtual capacitors, information can be encoded in a physical form. The circuitry may capacitively sense the disturbance or the amount of disturbance caused by the pattern by measuring changes in capacitance, and a decoder may then derive the information encoded in the pattern based on the detected change. The decoder effectively uses capacitive sensing to derive the information encoded in the physical form, i.e., the pattern, and translates the capacitances into a digital code.

Example 1

Openings in a Conductive Layer/Sheet

This capacitive sensing example supports the detection of openings (holes) and opening patterns, on a sheet made with conductive materials, or a sheet (uniformly) coated (on at least one side facing the electrodes) with conductive materials of any dimension. In some cases the material is coated with a conductive material such as a metal, and pattern of holes can be punched into the material. Conductive materials may include one or more of the following: PCB and Flex board metal conductor material, Carbon coatings, ITO (Indium Tin Oxide), etc.

A standard printed circuit board (PCB) or flex assembly can be used with a capacitive sensing decoder connecting to electrodes. Typically, the capacitive sensing decoder has circuitry for detecting changes in capacitance over the electrodes (e.g., a capacitive to digital converter), and a microprocessor (e.g., a decoder) for processing the data collected by the circuitry to decode the information encoded in the pattern. Specifically, a capacitive to digital (CDC) analog front end generates and applies an excitation source to establish an electric field on each electrode while continuously monitoring the energy on each electrode with on-chip analog front end circuitry.

During operation of a capacitive sensing decoder, a pattern provided using conductive material, e.g., a conductive layer/sheet made with conductive materials or (uniformly) coated with conductive materials will be positioned over the electrodes. If a region of the conductive material does not have an opening, e.g., a circular hole, over an electrode there will be a change in energy on the electrode due to the conductive material directly above the electrode. If a region of the conductive material contains an opening, e.g., a circular hole, there will be a minimal or no change in energy on the electrode because the path to shunt the electric field is weak due to the opening in the material. In some cases, different shapes or sizes of the opening may cause a discernible change in energy on the electrode that can be detected/measured. The ratio of the opening shape/size to electrode shape/size can vary depending on the application requirements and system mechanical constraints.

The capacitive sensing controller, preferably having a high resolution CDC and an environmental calibration engine to accurately measures this change in energy, i.e., the electric field, on the electrode and an algorithm is operated, e.g., using a microcontroller, to determine exactly how many openings are in the material and on which electrode has an opening above it. In some cases, the capacitive sensing controller may be able to distinguish between openings with different shapes and sizes (which may encode information having a higher resolution than binary information encoded by distinguishing whether there is conductive material or not above a particular electrode).

FIG. 1 shows an exemplary implementation of an apparatus configured to decode information encoded using a pattern of openings in a layer or sheet of conductive material, according to some embodiments of the disclosure. The exemplary apparatus comprises a plurality of electrodes E1, E2, E3, E4, E5, and E6 arranged spatially on, e.g., a printed circuit board. The electrodes serve as capacitive sensors for decoding a pattern provided using conductive materials. These electrodes are connected to circuitry, e.g., a capacitive to digital converter, to enable an electric field to be established over each electrode (illustrated using curved lines over E1 to E6 in the figure). Furthermore, the circuitry detects disturbance in the electric fields over these electrodes and converts the disturbance detected (or capacitive measurements related to the disturbance) to a digital signal. In this example, the apparatus further comprises a decoder for receiving the digital signal related to the capacitive measurements and decodes the information encoded in the pattern using the digital signal.

The pattern comprises a spatial arrangement of one or more openings in a layer or sheet of conductive material and one or more regions in the layer or sheet of conductive material without an opening. For instance, openings may be punched in a sheet of conductive material, or openings may be punched in a strip coated (at least partially) with conductive material.

An opening, in this context, means an aperture or gap is provided in the material. Each of the one or more openings and each of the one or more regions in the layer of conductive material without an opening are arranged to be positioned over a corresponding one of the plurality of electrodes. The one or more openings are each configured to substantially not change the electric field established by the corresponding one of the plurality of electrodes. The one or more regions in the layer of conductive material without an opening are each configured to substantially change the electric field established by the corresponding one of the plurality of electrodes. The opening is preferably sized to enable CDC to easily distinguish the change in the electric field caused by a region with an opening and a region without an opening.

In this example, the energy, i.e., the change in electric field, measured by the capacitive to digital converter (CDC) on electrodes E1 and E3 will be higher than the energy measured on electrodes E2, E4, E5 and E6. This is because some of the energy on electrodes E2, E4, E5, and E6 will be shunted to the conductive metal plane on the material. In this case, the decoder detects that two of the six electrodes, in particular, E1 and E3, has higher energy thus decoding that two openings were punched into the material. In one example, the decoder may derive, from the energy measurement provided by the CDC, a code "010111" being encoded in the pattern of openings, if the openings indicate a bit "0" and lack of an opening indicates a bit "1" (each electrode able to decode one bit). Similarly, the decoder may derive a code "101000" being encoded in the pattern of openings. If the openings indicate a bit "1" and a lack of an opening indicates a bit "0". In another example, the decoder may derive a value "2" based on detecting two openings, if each opening indicates a count of 1.

Example 2

Conductive Material Deposited on a Non-Conductive Strip

In this example, patterns of conductive material are printed or deposited on non-conductive material (e.g., using carbon printing). The conductive material may have any suitable shape or size arranged to selectively disturb the electric fields established by the electrodes. A standard printed circuit board (PCB) or flex assembly can be used with a capacitive sensing decoder connecting to electrodes. Typically, the capacitive sensing decoder has circuitry for detecting changes in capacitance over the electrodes (e.g., a capacitive to digital converter), and a microprocessor (e.g., a decoder) for processing the data collected by the circuitry to decode the information encoded in the pattern. Specifically, a capacitive to digital (CDC) analog front end generates and applies an excitation source to establish an electric field on each electrode while continuously monitoring the energy on each electrode with on-chip analog front end circuitry.

During operation of the capacitive sensing decoder, a pattern provided using conductive material, e.g., conductive material printed/deposited on a layer/sheet of non-conductive material will be positioned over the electrodes. Depending on the system and application, the conductive material can be either connected to a DC potential, GND or left floating. If a region of the non-conductive layer/sheet has conductive material over an electrode there will be a change in energy on the electrode due to the conductive material directly above the electrode. If a region of the non-conductive layer/sheet has no conductive material, there will be a minimal or no change in energy on the electrode because the path to shunt the electric field is weak due to the lack of conductive material in that region. In some cases, different shapes or sizes of the conductive material printed/deposited on the non-conductive layer/sheet may cause a discernible change in energy on the electrode that can be detected/measured. The ratio of the shape/size of the region with the conductive material printed/deposited on the non-conductive layer/sheet to electrode shape/size can vary depending on the application requirements and system mechanical constraints.

The conductive material pattern can be of any shape that matches the electrode pattern on the PCB or flex assembly. The electric field over one or more electrodes can be shunted using the conductive material pattern provided on the non-conductive material, and the capacitive to digital converter (CDC) can detect a change in energy, i.e., the electric field, of the corresponding electrodes. The capacitive sensing decoder, preferably having a high resolution CDC, accurately measures this change in energy, i.e., the electric field, on the electrode and an algorithm is operated, e.g., using a microcontroller, to determine exactly how many electrodes are shunted by the conductive material pattern and on which electrode has conductive material above it. In some cases, the capacitive sensing decoder may be able to distinguish between conductive material regions with different shapes and sizes (which may encode information having a higher resolution than binary information encoded by distinguishing whether there is conductive material or not above a particular electrode).

Figure 2:
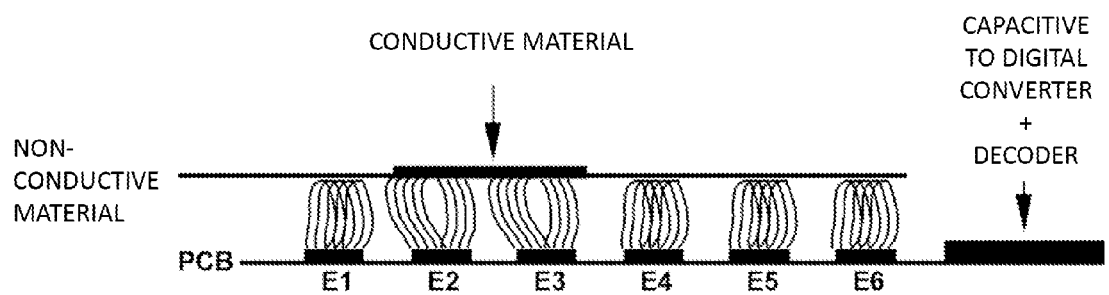
FIG. 2 shows another exemplary implementation an apparatus configured to decode information encoded using a pattern of conductive material deposited over a layer or sheet of non-conductive material, according to some embodiments of the disclosure.

FIG. 2 shows another exemplary implementation an apparatus configured to decode information encoded using a pattern of conductive material deposited over a layer or sheet of non-conductive material, according to some embodiments of the disclosure. The exemplary apparatus comprises a plurality of electrodes E1, E2, E3, E4, E5, and E6 arranged spatially on, e.g., a printed circuit board. The electrodes serve as capacitive sensors for decoding a pattern provided using conductive materials. These electrodes are connected to circuitry, e.g., a capacitive to digital converter, to enable an electric field to be established over each electrode (illustrated using curved lines over E1 to E6 in the figure). Furthermore, the circuitry detects disturbance in the electric fields over these electrodes and converts the disturbance detected (or capacitive measurements related to the disturbance) to an analog and/or a digital signal. In this example, the apparatus further comprises a decoder for receiving the digital signal related to the capacitive measurements and decodes the information encoded in the pattern using the digital signal.

The pattern comprises a spatial arrangement of one or more conductive regions of conductive material deposited on a layer or sheet of non-conductive material and one or more non-conductive regions of the layer or sheet of non-conductive material without the conductive material deposited thereon. For instance, a circular (or square, or any suitable shape) region of the non-conductive material may have conductive material printed thereon. The one or more conductive regions and the one or more non-conductive regions are each arranged to be positioned over a corresponding one of the plurality of electrodes when the pattern is positioned over the plurality of electrodes. The one or more conductive regions are each configured to substantially change the electric field established by the corresponding one of the plurality of electrodes. The one or more non-conductive regions are each configured to substantially not change the electric field established by the corresponding one of the plurality of electrodes. The opening is preferably sized to enable CDC to easily distinguish the change in the electric field caused by a region with conductive material printed/deposited there on and a region without conductive material.

In this example electrodes E2 and E3 are covered with the conductive material printed/deposited on non-conductive material as shown. The CDC may measure smaller energy on electrodes E2 and E3 because some of the electric field on these electrodes will be shunted to the metal conductive material on the material. In this example, a decoder using measurements from the CDC may detect that two of the six electrodes were lower energy thus determining that regions over two electrodes has conductive material. In one example, the decoder may derive, from the energy measurement provided by the CDC, a code "011000" being encoded in the pattern of conductive material printed/deposited on the non-conductive material, if the lack of conductive material over an electrode indicates a bit "0" and presence of conductive material over the electrode indicates a bit "1" (each electrode able to decode one bit). Similarly, the decoder algorithm may derive a code "100111" being encoded in the pattern, if presence of conductive material over an electrode indicates a bit "0" and the lack of conductive material over the electrode indicates a bit "1". In another example, the decoder may derive a value "2" based on detecting conductive material over two electrodes, if each electrode having a conductive region over the electrode indicates a count of 1.

Capacitive Sensing Decoder and its Functions

Figure 3:
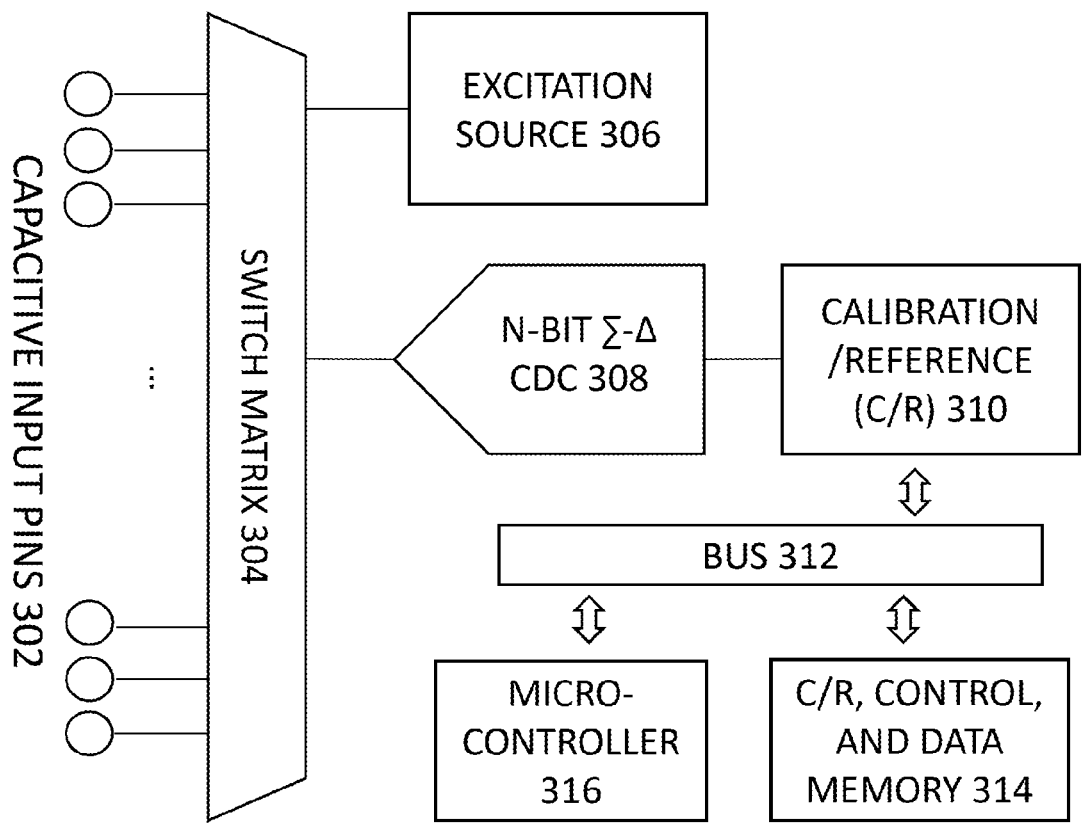
FIG. 3 shows an illustrative functional diagram of a capacitive sensing decoder, according to some embodiments of the disclosure.

FIG. 3 shows an illustrative functional diagram of a capacitive sensing decoder, according to some embodiments of the disclosure (the arrangement is merely serves as an example, a person skilled in the art would appreciate that other arrangement arrangements are envisioned). To support the functions of decoding a pattern as discussed herein, a capacitive sensing decoder may include capacitive input pins 302, switch matrix 304, excitation source 306, an N-bit (sigma-delta or SAR ADC converter) capacitive to digital converter (CDC) 308, calibration/reference engine 310, a communication bus 312, calibration/reference, control, and data memory 314, and microcontroller 316.

The electrodes, which are spatially arranged over, e.g., a printed circuit board, or flex circuit may be electrically connected to the capacitive input pins 302 (via signal traces). A switch matrix 304 may be provided to manage the signals from the excitation source to the electrodes 302 and signals from the electrodes 302 to the N-bit CDC 308. The bi-directional switch matrix 304 serves to selectively route the capacitive input pins 302 to the CDC 30 and the excitation source 306. In some embodiments, the switch matrix 306 can be configured to route any set of the signals from the capacitive input pins 302 by programming the control memory portion of the calibration/reference, control, and data memory 314 to control functions such as averaging, offsets, and gains for each of the sensors for sensing the capacitive input pins 302. An on-conversion sequencer may be provided to control how each of the capacitance inputs from the capacitive input pins 302 is polled.

Excitation source 306 serves to output an excitation signal to any of the capacitive input pins 302. In an embodiment, the excitation signal is 250 kHz but this can be vary depending on the final excitation sourced and materials used in the system. Accordingly, when the switch matrix 304 connects the excitation source 306 to each of capacitive input pins 302, the excitation signal charges the electrodes connected to the capacitive input pin. The N-bit CDC 308 serves to convert a capacitive input signal on a capacitive input pin into a digital value sample. Accordingly, when the switch matrix 304 connects the CDC 308 to one of the capacitive input pins 302, the CDC 308 digitizes the virtual capacitance formed by the corresponding electrode and the pattern, based on the charge at the electrode. In an embodiment, the CDC 308 can be but not limited to a 16-bit modulator (where N=16). Accordingly, the CDC 308 can be configured to output a 16-bit data stream. While a sigma-delta modulator may be used for converting an analog capacitive measurement signal to a digital signal, other implementations are also envisioned by this disclosure. The excitation source 306 and the CDC 308 together provide an analog front end which generates an excitation source for each electrode to establish the electric field measure changes in capacitance on the at least the subset of the plurality of electrodes, and provides the measured changes in capacitance as a digital signal to the decoder.

In an embodiment, the excitation source 306, in conjunction with the switch matrix 304, is configured to apply a square wave excitation to the capacitive input pins 302. The CDC 308 is configured to sample the charge the capacitive input pins 302. The output of the CDC 308 can be further processed via a digital filter (not shown). The microcontroller may access the calibration/reference, control, and data memory 314 to retrieve the capacitive measurements (or a derivation thereof) from the data memory to decode the information encoded in the pattern positioned over the electrodes.

In some cases, calibration/reference engine 310 may be (optionally) provided to calibrate the readings based on the environment/hardware or based on a reference reading on a reference electrode in order to provide accurate capacitive readings and decoding of information from those capacitive readings. Data used for calibration or reference readings may be stored in the calibration/reference portion of the calibration/reference, control, and data memory 314. The capacitive measurements on the capacitive input pins 302 may ultimately be provided to communication bus 312 for storage in the data portion of the calibration/reference, control, and data memory 314.

For purposes of enabling a person with ordinary skill in the art to understand various implementations or support for the implementations of the functions described herein, it is noted that products ADuCM350 or AD7147/8 from Analog Devices Inc. may be used to provide some of the components described herein.

Hardware Implementation

Figure 4:
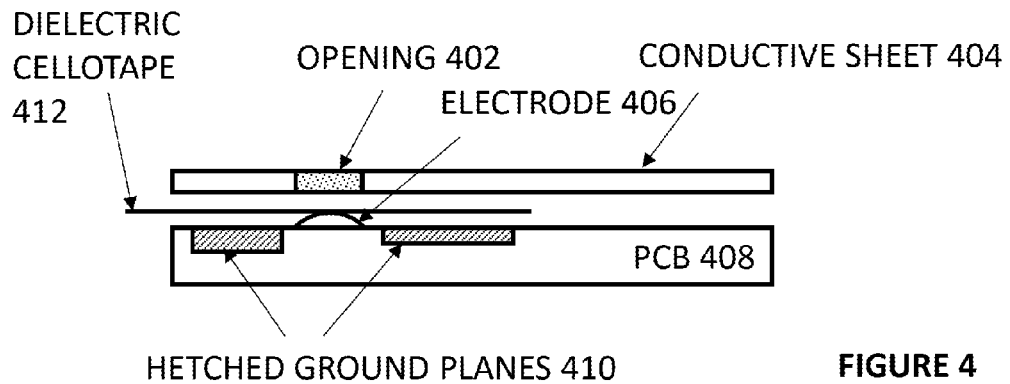
FIG. 4 shows a cross-section view of a single sensor electrode provided on a printed circuit board and a single opening positioned over the sensor electrode, according to some embodiments of the disclosure.

FIG. 4 shows a cross-section view of a single sensor electrode provided on a printed circuit board and a single opening positioned over the sensor electrode, according to some embodiments of the disclosure. The cross-section is taken along a plane which cuts from the front side of the electrode facing towards the opening (when the opening is positioned over the electrode) to the backside of the printed circuit board on which the electrode is provided. The single sensor electrode is shown to illustrate the structure of the system.

An opening 402 is provided on a layer/sheet of conductive material 404 (in a fashion similar to the example shown in FIG. 1). During operation, the opening 402 is positioned over the electrode 406, which is provided on PCB 408. The sheet of conductive material (either made of conductive material or coated with conductive material on at least the side which faces the electrode 406) may be placed above PCB 408, e.g., assisted by mechanical guides and/or stops, to position the opening 402 (or the pattern itself) over the corresponding electrodes properly. The PCB 408 may be provided with hetched ground planes 410 on two sides of the electrode 406. A dielectric material, e.g., dielectric cellotape 412, may be provided over the electrode 406 (and hetched ground planes 410) to control the dielectric over the electrode.

Figure 5:
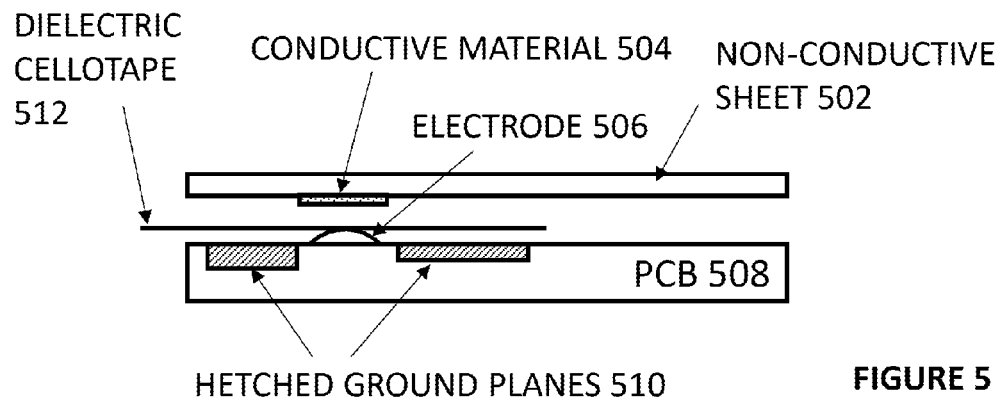
FIG. 5 shows a cross-section view of a single sensor electrode provided on a printed circuit board and a conductive region of a layer or sheet of non-conductive material positioned over the sensor electrode, according to some embodiments of the disclosure.

FIG. 5 shows a cross-section view of a single sensor electrode provided on a printed circuit board and a conductive region of a layer or sheet of non-conductive material positioned over the sensor electrode, according to some embodiments of the disclosure. The cross-section is taken along a plane which cuts from the front side of the electrode facing towards the conductive material deposited on the non-conductive material (when the pattern is positioned over the electrode) to the backside of the printed circuit board on which the electrode is provided. The single sensor electrode is shown to illustrate the structure of the system.

A region of a sheet of non-conductive material 502 is provided with conductive material 504 deposited thereon (providing a conductive region in a fashion similar to the example shown in FIG. 2). During operation, the conductive material 506 is positioned over the electrode 506, which is provided on PCB 508. The sheet of non-conductive material 502 may be placed above the PCB 508, e.g., assisted by mechanical guides and/or stops, to position the conductive material 504 (or the pattern itself) over the corresponding electrodes properly. The PCB 508 may be provided with hetched ground planes 510 on two sides of the electrode 506. A dielectric material, e.g., dielectric cellotape 512, may be provided over the electrode 506 (and hetched ground planes 510) to control the dielectric over the electrode.

Encoding Using the Pattern

The ability to encode information in a pattern comes from the feature of being able to detect changes in capacitance over the electrodes caused by the pattern. The spatial arrangement of pattern may selectively cause disturbance over at least a subset of the electric fields established by the electrodes when the pattern is placed over the plurality of electrodes, and provide a code derived from the analog capacitance measurements, or in binary format after post processing such as the decoder algorithm. The code may be a secret code, an identifier for an object/person, or an identifier for a command to be executed. The code is embedded in the spatial arrangement of the pattern to select which of the electrodes to disturb, and in the choice of whether to disturb a particular one of the electrodes. For instance, the information encoded in the pattern comprises a number of bits of binary information, wherein the number of the plurality of electrodes correspond to the number of bits of binary information encoded in the pattern, or each electrode used for the pattern can decode one bit of binary information.

In one embodiment, the pattern, when placed over the one or more electrodes, causes the electric field generated by each of one or more electrodes to be in one of two states: (1) a substantially undisturbed state, and (2) a disturbed state. The pattern may be arranged with holes, or with conductive material deposited in suitable regions, to cause two different kinds of disturbances on the electric fields generated by the electrodes. These two states encode a bit of information for each electrode. The capacitive to digital converter may detect change in at least a subset of the electric fields caused by the pattern by measuring changes in capacitance over the plurality of electrodes, and determine a corresponding one of the two states of the electric field for each of the plurality of electrodes based on the measured changes in capacitance. The decoder algorithm derives the information encoded in the pattern based on the determined corresponding one of the two states. For instance, the measured changes in capacitance may be compared against one or more reference values or calibrated values (e.g., stored in memory and provided by a calibration/reference engine, or preconfigured) to translate the measured changes into one of the two states.

In some embodiments, the pattern may be arranged with holes, or with conductive material deposited in suitable regions, to cause more than two (e.g., three) different kinds of disturbances on the electric fields generated by the electrodes by using different sizes and/or shapes of the opening or conductive regions. For instance, two different sizes of holes may be used to provide three different kinds of disturbances (e.g., substantially undisturbed, somewhat undisturbed, and substantially disturbed) that is discernible/detectable by the capacitive to digital decoder. These states may encode, e.g., ternary information for each electrode. The capacitive to digital converter may detect change in at least a subset of the electric fields caused by the pattern by measuring changes in capacitance over the plurality of electrodes, and determine a corresponding one of the states of the electric field for each of the plurality of electrodes based on the measured changes in capacitance. The decoder derives the information encoded in the pattern based on the determined corresponding one of the states. For instance, the measured changes in capacitance may be compared against one or more reference values to translate the measured changes into one of the states.

Exemplary Decoders Using Eight Electrodes

To further illustrate uses for the capacitive sensing decoder, an example using eight electrodes spatially arranged in a 2 by 4 fashion for reading an exemplary pattern are explained. In this example, all eight electrodes, each electrode arranged to establish an electric field, may be used to each decode a bit of information. The electrodes are arranged to decode information encoded in a pattern provided using a strip. Circuitry is provided for detecting change in at least a subset of the electric fields caused by the pattern when the pattern provided on the strip is positioned over the electrodes. A decoder is also provided for deriving the information encoded in the pattern based on the detected change. For these exemplary decoders, the strip may be a glucose meter test strip with chemicals which react to glucose deposited thereon. The plurality of electrodes, circuitry, and the decoder are provided in a glucose meter adapted to receive the strip such that when the strip is inserted into the glucose meter, the pattern is positioned over the plurality of electrodes. The pattern provided on the strip encodes an identifier for distinguishing batches of glucose meter test strips.

Figure 6A:
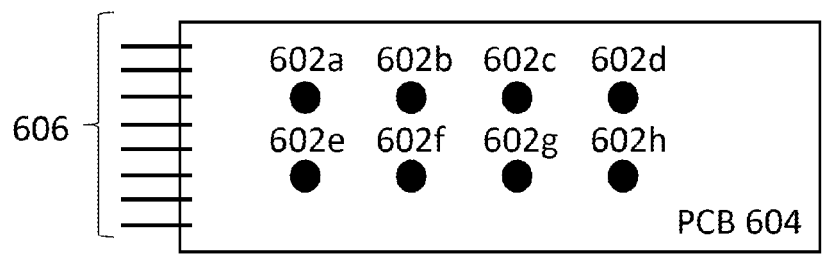
FIGS. 6A-6C show top views of illustrative electrodes, an illustrative pattern, and the illustrative pattern positioned over the electrodes, respectively, according to some embodiments of the disclosure.
Figure 6B:
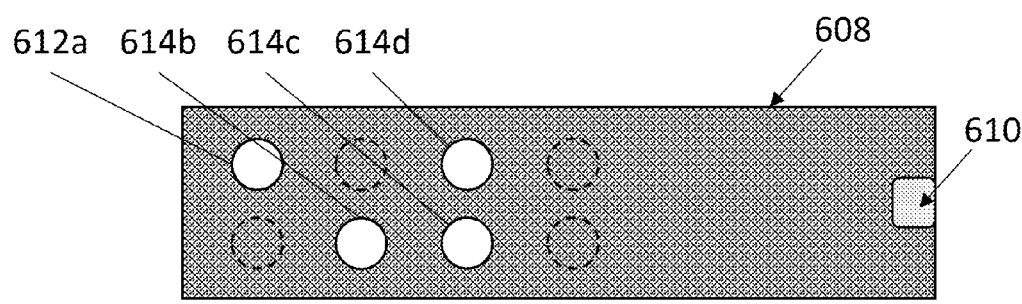
Figure 6C:
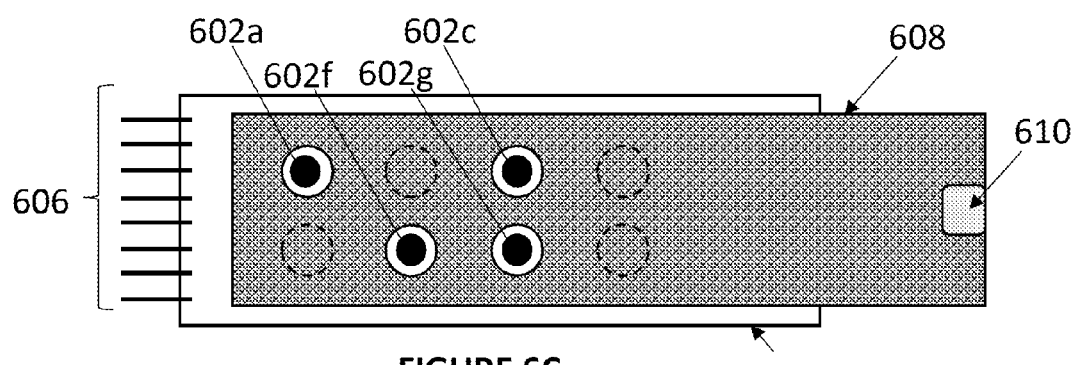

FIGS. 6A-6C show top views of illustrative electrodes, an illustrative pattern, and the illustrative pattern positioned over the electrodes, respectively, according to some embodiments of the disclosure. As shown, electrodes 602a-602h are spatially arranged on PCB 604, and the electrodes may be connected to the circuitry through signal traces 606. A glucose meter test strip 608 (which may have a conductive material coated on at least a portion of the test strip, and has the chemicals 610 which react to glucose provided on one end of the strip) is shown to have a pattern comprising four openings 612a, 614b, 614c, 614d which correspond to electrodes 602a, 602f, 602g, and 602c, respectively. Areas of the glucose meter test strip 608 without an opening over the corresponding electrodes 602b, 602d, 602e, and 602h are denoted using circles with a dotted outline. For this particular pattern, the circuitry may detect a difference in the capacitances measured at the electrodes between electrodes 602a, 602f, 602g, and 602c facing an opening and electrodes 602b, 602d, 602e, and 602h which do not face an opening. A decoder may translate the detectable differences in capacitances into information encoded in the pattern.

Figure 7A:
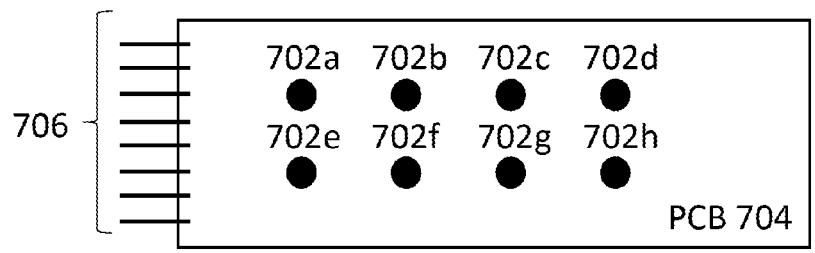
FIGS. 7A-7C show top views of illustrative electrodes, another illustrative pattern, and the illustrative pattern positioned over the electrodes, respectively, according to some embodiments of the disclosure.
Figure 7B:
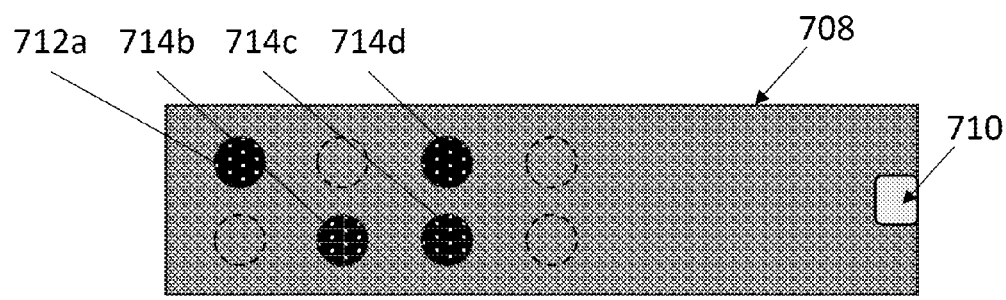
Figure 7C:
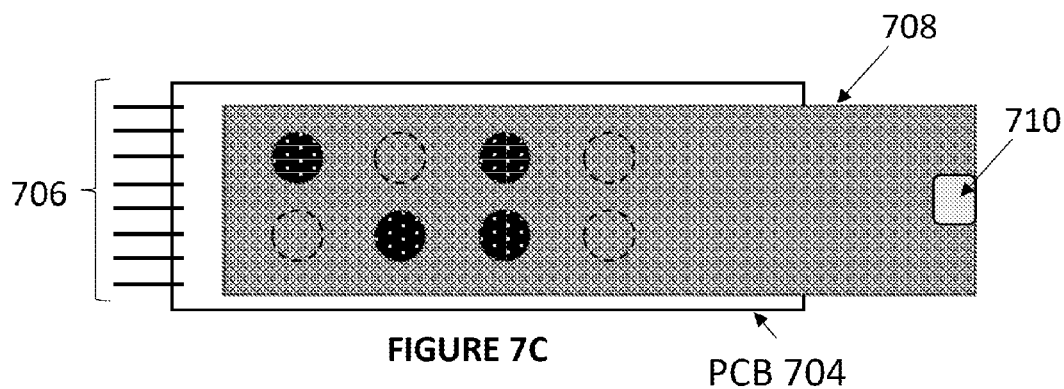

FIGS. 7A-7C show top views of illustrative electrodes, another illustrative pattern, and the illustrative pattern positioned over the electrodes, respectively, according to some embodiments of the disclosure. As shown, electrodes 702a-702h are spatially arranged on PCB 704, and the electrodes may be connected to the circuitry through signal traces 706. A glucose meter test strip 708 (may include a layer/sheet of non-conductive material, and has the chemicals 710 which react to glucose provided on one end of the strip) is shown to have a pattern comprising four conductive regions 712a, 714b, 714c, 714d (i.e., regions of the layer/sheet of non-conductive material with conductive material printed/deposited thereon) which correspond to electrodes 702a, 702f, 702g, and 702c, respectively. For the same information encoded in the pattern shown in FIGS. 6B and 6C, a glucose meter strip 708 encodes the information using patches of conductive material printed/deposited thereon. Regions of the layer/sheet of non-conductive material of the glucose meter test strip 608 over the corresponding electrodes 702b, 702d, 702e, and 702h are denoted using circles with a dotted outline. For this particular pattern, the circuitry may detect a difference in the capacitances measured at the electrodes between electrodes 702a, 702f, 702g, and 702c facing a region having the conductive material and electrodes 702b, 702d, 702e, and 702h which do not face a region having the conductive material. A decoder may translate the detectable differences in capacitances into information encoded in the pattern.

Other Variations: Reference Electrode and Asymmetric Arrangements

To provide an analog front end which is able to accurately measure the small changes in capacitances over the electrodes, absolute and relative measurements are supported. In both cases, the analog front end (having the capacitive to digital converter and the decoder) may compare the measured capacitance changes/values against one or more reference values to detect disturbances on the electric fields.

To provide absolute measurements, one or more preconfigured values may be provided in a memory as reference values, e.g., preconfigured values (i.e., expected measured capacitance values) may be predetermined and loaded to memory to allow the analog front end to detect whether an electrode faces conductive material or not.

To provide relative measurements, one or more PCB electrodes (i.e., utilizing one or more capacitive input pins) would be dedicated as a reference electrode for generating an electric field and measuring the energy to provide a reference measurement. For instance, the reference electrode may be arranged to face one of the following: (1) a region of a layer/sheet of conductive material with a hole, (2) a region of a layer/sheet of conductive material without a hole; (3) a region of a layer/sheet of non-conductive material with conductive material printed/deposited thereon, and (4) a region of a layer/sheet of non-conductive material without conductive material printed/deposited thereon. The one or more reference values allowing the analog front end to detect disturbances on the electric fields may then be determined by measuring capacitance changes on the reference electrode. In some cases, the reference electrodes may be arranged to face openings/regions of different sizes/shapes to enable the analog front end to distinguish between the sizes/shapes based on measured capacitance values and the reference values from those reference electrodes. The measured capacitance changes/values may be stored in memory. The measurements from the remaining electrodes used in decoding the pattern may be compared to the reference values generated from the reference electrode to make a relative measurement.

Naturally, using a reference electrode may take up one of the plurality of electrodes available for decoding. For instance, the ADuCM350 can support up to 6 electrodes therefore a 6-bit resolution decoder can be provided for an absolute measurement option and a 5-bit decoder can be provided for the relative measurement option. Similarly the AD7147 can support up to 13 electrodes therefore a 13-bit resolution decoder can be provided for an absolute measurement option and a 12-bit decoder can be provided for the relative measurement option. The AD7148 can support up to 8 electrodes therefore a 8-bit resolution decoder can be provided for an absolute measurement option and a 7-bit decoder can be provided for the relative measurement option.

Figure 8A:
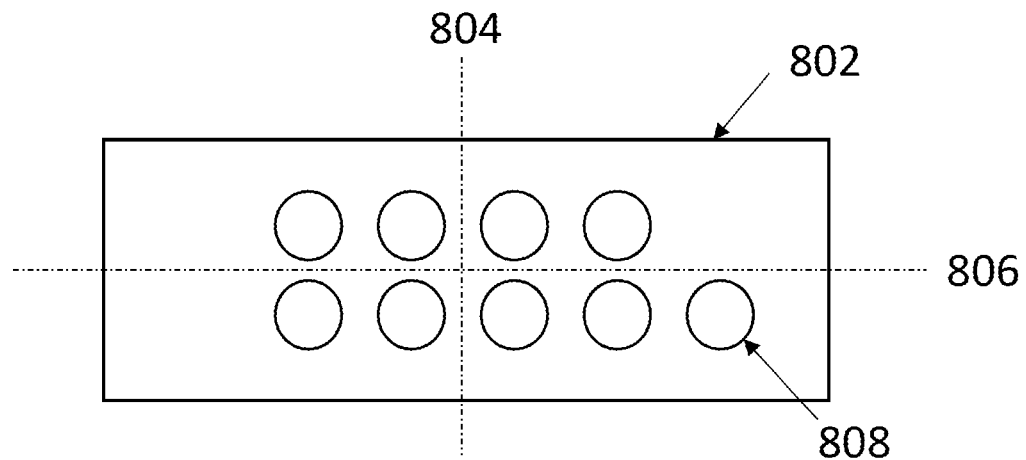
FIG. 8A-8B show two exemplary patterns, according to some embodiments of the disclosure.
Figure 8B:
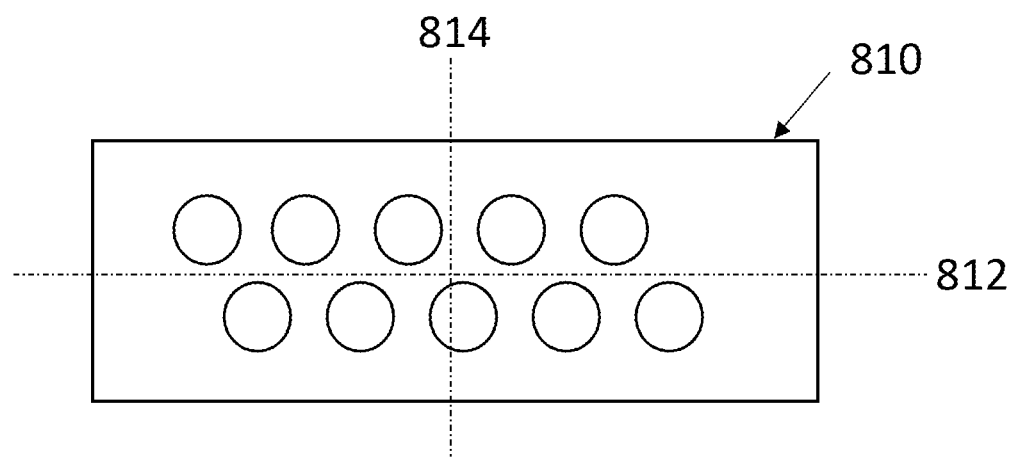

FIG. 8A-8B show two exemplary patterns, according to some embodiments of the disclosure. Depending on the design of the pattern, other information may be derivable from a strip. For instance, if the design of the pattern is asymmetric, the capacitive measurements may indicate whether the strip has been inserted with the correct orientation to allow proper decoding to occur. The exemplary pattern on strip 802 shown in FIG. 8A is asymmetric along two axes (axis 804 and axis 808). In particular, has a region 804 that may allow the decoder to determine whether the strip 802 is positioned over the electrodes with the proper orientation. For instance, an electrode may be provided on a PCB to expect an opening in region 804 if the pattern is positioned over the electrodes with the proper orientation. The decoder would then expect to receive capacitance values associated with a region having an opening for that electrode, if the strip is positioned properly. However, if the strip is not positioned according to the orientation shown in the figure, the electrode expecting the region 808 would then measure capacitance values associated with a region without an opening. The decoder may then detect that the strip has not been positioned over the electrodes properly. The electrode expecting region 804 may be dedicated for determining the orientation of the strip 802, and not used for decoding information encoded in the pattern.

Besides utilizing an opening in region 804, an asymmetric pattern may be provided using a region without an opening, a region with conductive material, or a region without conductive material, as long as the electrodes are positioned and arranged to detect when the pattern is not positioned over the electrodes in the proper orientation.

The exemplary pattern on strip 810 shown in FIG. 8B can detect if the strip 802 has been rotated clockwise by 180 degrees, flipped around axis 806, and flipped around axis 804. In a similar fashion, the exemplary pattern on strip 810 can detect if the strip 810 has been flipped around axis 812, and flipped around axis 814, because electrodes expecting to decode a pattern in the orientation as shown would measure capacitance values which are associated with incorrect capacitive readings corresponding to a pattern which is not positioned with the proper orientation.

Method and Apparatus for Decoding

Figure 9:
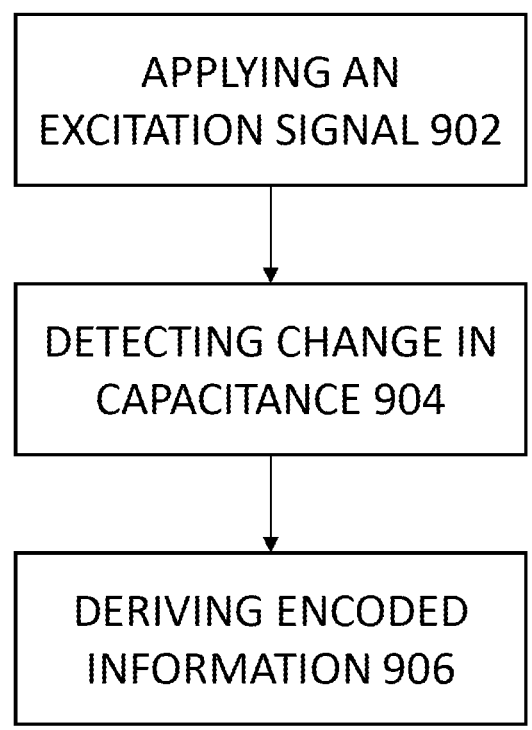
FIG. 9 shows a flow diagram illustrating a method for decoding information encoded in a pattern, according to some embodiments of the disclosure.

FIG. 9 shows a flow diagram illustrating a method for decoding information encoded in a pattern, according to some embodiments of the disclosure, and The flow diagram in FIG. 9 illustrates a method for decoding information encoded in a pattern. At step 902, an analog front end applies an excitation signal to a plurality of electrodes, each electrode arranged to establish an electric field. At step 904, an analog front end, e.g., having circuitry, detects change in at least a subset of the electric fields caused by the pattern when the pattern is positioned over the plurality of electrodes. At step 906, a decoder derives the information encoded in the pattern based on the detected change.

In some embodiments, step 904 comprises measuring the capacitance changes on each electrode. Moreover, step 906 comprises comparing the measured capacitance changes against one or more reference values. In some embodiments, the method further includes applying the excitation signal to a reference electrode arranged to establish an electric field, wherein the one or more reference values is determined by measuring capacitance changes on the reference electrode.

In some embodiments, step 904 comprises measuring changes in on the at least the subset of the plurality of electrodes and providing the measured changes in capacitance as a digital signal to the decoder.

In some embodiments, the pattern, when placed over the one or more electrodes, causes the electric field generated by each of one or more electrodes to be in one of two states. The two states comprises (1) a substantially undisturbed state, and (2) a disturbed state. The analog front end may detect change in at least a subset of the electric fields caused by the pattern by measuring changes in capacitance over the plurality of electrodes. Furthermore, the analog front end and/or the decoder may determine a corresponding one of the two states of the electric field for each of the plurality of electrodes based on the measured changes in capacitance. Accordingly, the decoder derives the information encoded in the pattern based on the determined corresponding one of the two states.

Figure 10:
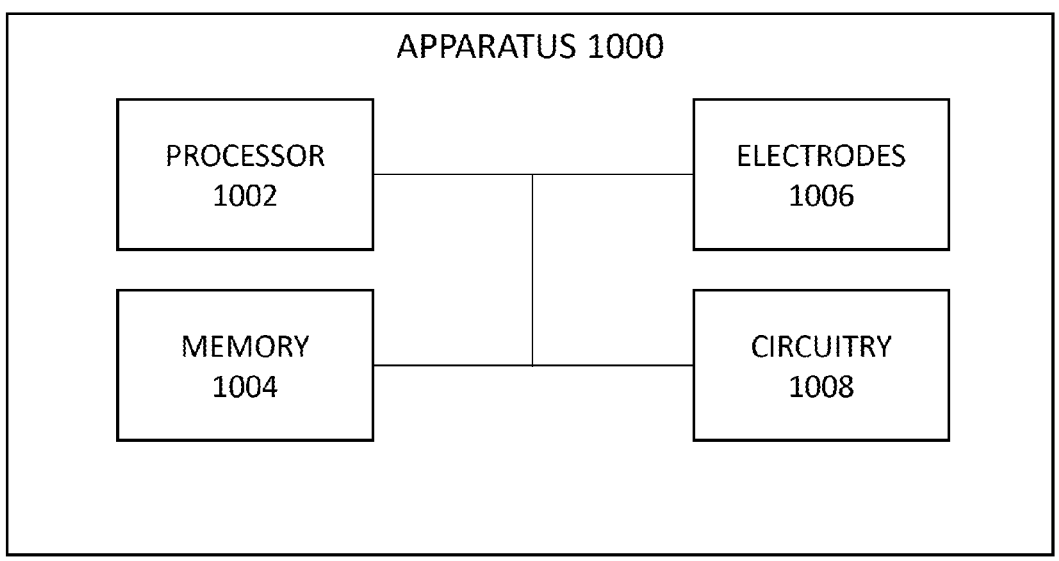
FIG. 10 shows an exemplary schematic drawing of an apparatus for decoding information encoded in a pattern, according to some embodiments of the disclosure.

FIG. 10 shows an exemplary schematic drawing of an apparatus for decoding information encoded in a pattern, according to some embodiments of the disclosure. The apparatus may be a glucose meter, or any apparatus which may utilize the capacitive sensing decoder as described herein. The apparatus 1000 comprises processor 1002, memory 1004, electrodes 1006, and circuitry 1008, which may be communicably connected to each other. The apparatus may have other additional functions and interfaces not shown (such as communication connectors, modems, etc.).

The processor 1002 serves to control the operation of the apparatus and process the decoding algorithm. In some cases, the processor can provide the functions disclosed herein, e.g., controlling an excitation source, a capacitive to digital converter, access to memory 1004, a communication bus, a calibration/reference engine, a decoder, etc. In some embodiments, the processor 1002 can include one or more processing elements such as, for example, central processing units (CPUs), digital signal processors (DSPs), application-specific integrated circuits (ASICs), field-programmable gate arrays (FPGAs), etc. The processor 1002 can read instructions and data from the memory 1004, and can write data to the memory 1004. In an embodiment, the processor 1002 can execute instructions that cause the apparatus to perform one or more methods described herein.

The memory 1004 serves to store instructions and measured capacitance data for use by at least the processor 1002 (e.g., capacitive measurement data, control data, calibration/reference values, etc.). In various embodiments, components of the apparatus 1000 can directly access the memory 1002 such as by, for example, a direct memory access (DMA) architecture via a bus. The memory 1002 can include one or more of read-only memory (ROM) and random access memory (RAM), and non-volatile random access memory (NVRAM). In various embodiments, the memory 1002 can include removable or fixed machine-readable media such as, for example, a hard disk, flash memory, CD-ROM, etc.

Electrodes 1006 are provided for capacitive sensing, and are generally provided using conductive material to serve as a plate to a virtual capacitor and to establish an electric field. As discussed herein, the electrodes 1006 can include an electrode on a single or multiple-layer printed circuit board (PCB), a flex circuit, printed carbon, ITO and/or any other single or multiple layer conductor-insulator stack. The circuitry is provided as an analog front end to measure capacitance over the electrodes 1006. For instance, the circuitry may include an integrated capacitance-to-digital converter (CDC).

Exemplary Applications and Variations

Besides glucose meter strips, this capacitive sensing decoder may be applied in other situations where a low-cost/low-complexity/low-resolution decoder is desirable. For instance, the capacitive sensing decoder may be used for encoding and decoding identifiers for distinguishing products, objects, and/or inventory. The capacitive sensing decoder may be particularly useful in applications which already uses an analog front end for detecting changes in capacitance, because the decoder can be readily implemented with the existing circuitry and processes.

In the discussions of the embodiments above, the components described herein can readily be replaced, substituted, or otherwise modified in order to accommodate particular circuitry needs. Moreover, it should be noted that the use of complementary electronic devices, hardware, software, etc. offer an equally viable option for implementing the teachings of the present disclosure.

Another aspect of the subject matter described in the disclosure provides a non-transitory computer-readable medium comprising code that, when executed, causes an apparatus to decode information encoded in a pattern using capacitive sensing by carrying out any of the methods disclosed herein.

In one example embodiment, any number of electrical circuits for implementing the functions described herein may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself.

In another example embodiment, the electrical circuits, such as an analog front end and/or a decoder, for implementing the functions described herein may be implemented as stand-alone modules (e.g., a device with associated components and circuitry configured to perform a specific application or function) or implemented as plug-in modules into application specific hardware of electronic devices. Note that particular embodiments of the present disclosure may be readily included in a system on chip (SOC) package, either in part, or in whole. An SOC represents an IC that integrates components of a computer or other electronic system into a single chip. It may contain digital, analog, mixed-signal, and often radio frequency functions: all of which may be provided on a single chip substrate. Other embodiments may include a multi-chip-module (MCM), with a plurality of separate ICs located within a single electronic package and configured to interact closely with each other through the electronic package. In various other embodiments, the amplification functionalities may be implemented in one or more silicon cores in Application Specific Integrated Circuits (ASICs), Field Programmable Gate Arrays (FPGAs), and other semiconductor chips.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular processor and/or component arrangements. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Note that all optional features of the apparatus described above may also be implemented with respect to the method or process described herein and specifics in the examples may be used anywhere in one or more embodiments.

The 'means for' in these instances (above) can include (but is not limited to) using any suitable component discussed herein, along with any suitable software, circuitry, hub, computer code, logic, algorithms, hardware, controller, interface, link, bus, communication pathway, etc. In a second example, the system includes memory that further comprises machine-readable instructions that when executed cause the system to perform any of the activities discussed above.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A glucose meter for decoding information encoded in a pattern provided in a consumable glucose meter test strip, the glucose meter comprising:
   a plurality of electrodes spatially arranged on a circuit board of the glucose meter, each electrode arranged to establish an electric field;
   capacitive sensing circuitry for detecting changes in capacitance in at least a subset of the electric fields caused by the pattern when the pattern provided on the consumable glucose meter test strip is positioned over the plurality of electrodes, wherein:
      the pattern comprises a spatial arrangement of one or more openings through the consumable glucose meter test strip and one or more regions of the consumable glucose meter test strip without an opening; and
      the one or more openings have different shapes and/or sizes to encode one of at least three states; and
   a decoder for deriving the information encoded in the pattern based on the detected changes in capacitance, wherein the information encoded in the pattern identifies a particular batch of consumable glucose meter test strips and the information is used for calibrating the glucose meter.

2. The glucose meter of claim 1, wherein:
   the one or more openings are punched into conductive material of the consumable glucose meter test strip.

3. The glucose meter of claim 2, wherein:
   the one or more openings are punched into the consumable glucose meter test strip that is coated partially with conductive material.

4. The glucose meter of claim 2, wherein the conductive material includes one or more of: carbon coating, and Indium Tin Oxide.

5. The glucose meter of claim 3, wherein the conductive material includes one or more of: carbon coating, and Indium Tin Oxide.

6. The glucose meter of claim 1, wherein:
   the capacitive sensing circuitry and the decoder are configured to distinguish the openings of different sizes by detecting, using the plurality of electrodes, discernible changes in capacitance corresponding to different sizes of openings.

7. The glucose meter of claim 1, further comprising: mechanical guides to position the pattern over the plurality of electrodes when the consumable glucose meter test strip is inserted into the glucose meter.

8. The glucose meter of claim 1, further comprising:
   a plurality of reference electrodes, wherein each one of the reference electrodes are arranged to face the openings of different sizes when the consumable glucose test meter strip is inserted into the test meter to determine reference values corresponding to the openings of different sizes, and the reference values are compared against the measured changes in capacitance to translate the measured changes into one of the at least three states.

9. The glucose meter of claim 1, wherein:
   the capacitive sensing circuitry and the decoder are configured to distinguish the openings of different shapes by detecting, using the plurality of electrodes, discernible changes in capacitance corresponding to different shapes of openings.

10. The glucose meter of claim 1, further comprising:
   a plurality of reference electrodes, wherein each one of the reference electrodes are arranged to face the openings of different shapes when the consumable glucose test meter strip is inserted into the test meter to determine reference values corresponding to the openings of different shapes, and the reference values are compared against the measured changes in capacitance to translate the measured changes into one of the at least three states.

11. The glucose meter of claim 1, wherein:

the pattern, when placed over the one or more electrodes, causes the electric field generated by each of one or more electrodes to be in one of three discernable states;

the capacitive sensing circuitry is configured to determine a corresponding one of the three states for each of the plurality of electrodes based on the measured changes in capacitance; and the decoder derives the information encoded in the pattern based on the determined corresponding one of the three states.

12. A consumable glucose test meter strip comprising:

conductive material;

chemicals that react with glucose; and a pattern comprising a spatial arrangement of one or more openings punched through conductive material of the glucose meter test strip and one or more regions of the consumable glucose meter test strip without an opening, wherein the pattern encodes an identifier for a particular batch of consumable glucose meter test strips usable for calibrating a glucose meter, and the one or more openings have different shapes and/or sizes to encode one of at least three states.

13. The consumable glucose test meter strip of claim 12, wherein:

the conductive material through which the one or more holes are punched comprises a conductive coating on the consumable glucose test meter strip.

14. The consumable glucose test meter strip of claim 13, wherein the conductive coating includes one or more of: carbon coating, and Indium Tin Oxide.

15. A method for decoding information encoded in a pattern provided in a consumable glucose meter strip, the method comprising:

applying an excitation signal to a plurality of electrodes spatially arranged on a circuit board of a glucose meter, each electrode arranged to establish an electric field;

detecting, by capacitive sensing circuitry, changes in at least a subset of the electric fields caused by the pattern when the pattern provided on the consumable glucose meter test strip is positioned over the plurality of electrodes, wherein the pattern comprises a spatial arrangement of one or more openings through the consumable glucose meter test strip and one or more regions of the consumable glucose meter test strip without an opening, and the one or more openings comprises openings of different sizes and/or shapes to encode one of at least three states;

deriving, using a decoder, the information encoded in the pattern based on the detected change, wherein the information encoded in the pattern identifies a particular batch of consumable glucose meter test strips; and calibrating the glucose meter using the information.

16. The method of claim 15, further comprising:

determining a corresponding one of the three states for each of the plurality of electrodes based on the measured changes in capacitance; and deriving the information encoded in the pattern based on the determined corresponding one of the three states.

17. The method of claim 15, further comprising:

determining reference values corresponding to the openings of different sizes by a plurality of reference electrodes, wherein each one of the reference electrode are arranged to face the openings of different sizes when the consumable glucose test meter strip is inserted into the test meter.

18. The method of claim 17, further comprising:

comparing the reference values compared against the measured changes in capacitance to translate the measured changes into one of the at least three states.

19. The method of claim 15, further comprising:

determining reference values corresponding to the openings of different shapes by a plurality of reference electrodes, wherein each one of the reference electrode are arranged to face the openings of different shapes when the consumable glucose test meter strip is inserted into the test meter.

20. The method of claim 19, further comprising:

comparing the reference values compared against the measured changes in capacitance to translate the measured changes into one of the at least three states.

* * * * *